(12) United States Patent
Yeom et al.

(10) Patent No.: US 9,359,965 B2
(45) Date of Patent: Jun. 7, 2016

(54) TURBO-CHARGER SYSTEM

(71) Applicant: Hyundai Motor Company, Seoul (KR)

(72) Inventors: Kitae Yeom, Seoul (KR); Jaesik Yang, Seoul (KR); Sung Won Kim, Hwaseong-si (KR); Tae Won Hwang, Seoul (KR); Hong-Young Lee, Daejeon (KR)

(73) Assignee: Hyundai Motor Company, Seoul (KR)

( * ) Notice: Subject to any disclaimer, the term of this patent is extended or adjusted under 35 U.S.C. 154(b) by 72 days.

(21) Appl. No.: 14/099,361

(22) Filed: Dec. 6, 2013

(65) Prior Publication Data

US 2014/0182287 A1 Jul. 3, 2014

(30) Foreign Application Priority Data

Dec. 31, 2012 (KR) ........................ 10-2012-0158626

(51) Int. Cl.
*F02B 33/44* (2006.01)
*F02D 41/00* (2006.01)
*F02B 29/04* (2006.01)
*F02D 41/06* (2006.01)
*F02B 39/00* (2006.01)
*F02D 41/10* (2006.01)

(52) U.S. Cl.
CPC ........ *F02D 41/0007* (2013.01); *F02B 29/0418* (2013.01); *F02D 41/065* (2013.01); *F02B 39/00* (2013.01); *F02D 41/10* (2013.01); *Y02T 10/144* (2013.01); *Y02T 10/146* (2013.01)

(58) Field of Classification Search
CPC .. F02B 29/0418; F02B 39/00; F02D 41/0007; F02D 41/065; F02D 41/10; Y02T 10/144
USPC .................. 60/605.1, 611, 599; 123/561, 563
See application file for complete search history.

(56) References Cited

U.S. PATENT DOCUMENTS

| 4,506,648 A * | 3/1985 | Roberts .......................... 123/564 |
| 6,817,173 B2 * | 11/2004 | Paffrath et al. .................. 60/293 |
| 7,963,832 B2 * | 6/2011 | Bellinger ....................... 454/155 |
| 2007/0197157 A1 * | 8/2007 | Bellinger ....................... 454/155 |

FOREIGN PATENT DOCUMENTS

| JP | 57-195820 A | 12/1982 |
| JP | 61-058918 A | 3/1986 |

* cited by examiner

*Primary Examiner* — Jorge Leon, Jr.
(74) *Attorney, Agent, or Firm* — Morgan, Lewis & Bockius LLP

(57) ABSTRACT

A turbocharger system includes a compressor that is connected with a turbine operated by an exhaust gas by a rotary shaft and compresses and supplies external gas to a combustion chamber of an engine, an intercooler and a throttle valve disposed in an intake line connecting the compressor with the combustion chamber of the engine, a branch line connecting an intake line between the compressor and the intercooler with an intake line between the intercooler and the throttle valve, a shutoff valve disposed in the branch line to selectively open/close the branch line, and an engine control unit controlling the operation of the shutoff valve.

7 Claims, 3 Drawing Sheets

TURBO-CHARGER SYSTEM

CROSS-REFERENCE TO RELATED APPLICATION

The present application claims priority of Korean Patent Application Number 10-2012-0158626 filed Dec. 31, 2012, the entire contents of which application is incorporated herein for all purposes by this reference.

BACKGROUND OF INVENTION

1. Field of Invention

The present invention relates to a turbocharger system. More particularly, the present invention relates to a turbocharger system that can compensate for boost pressure suddenly dropping at the upstream side further than a throttle valve due to sudden opening of the throttle valve, when a vehicle is suddenly accelerated.

2. Description of Related Art

In general, a turbocharger is a device that turns a turbine using the pressure of an exhaust gas from an engine and then increases the output of the engine by supplying high-pressure air into a combustion chamber, using the torque of the turbine.

The compressed air that has passed through the turbocharger is cooled through an intercooler in an intake line and then supplied into the combustion chamber of the engine through the throttle valve.

FIG. 1 is a schematic diagram of a turbocharger system according to the related art.

Referring to FIG. 1, in a common turbocharger system, a turbine 22 is turned by an exhaust gas discharged through an exhaust pipe 7 from an exhaust manifold 5 and a compressor 21 connected with the turbine 22 by a rotary shaft 23 sucks and compresses external air through an intake pipe 9 while operating, such that compressed air is supplied into a combustion chamber 31 of an engine 30 through an intake line 1.

The supplied air is cooled through an intercooler 3 in the intake line 1 and supplied into the combustion chamber 31 of the engine 30 through a throttle valve 10.

However, the turbocharger system 20 of the related art has a problem in that turbo-lag is generated by a sudden drop in boost pressure at the upstream side further than the throttle valve 10 due to sudden opening of the throttle valve 10 that controls the amount of air to be supplied into the combustion chamber 31, in sudden acceleration of a vehicle.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a turbocharger system having advantages of being able to compensate for boost pressure dropping due to sudden opening of a throttle valve at the upstream side further than the throttle valve.

Various aspects of the present invention provide for a turbocharger system with a compressor that is connected with a turbine operated by an exhaust gas by a rotary shaft and compresses and supplies external gas to a combustion chamber of an engine. The turbocharger system may include: an intercooler and a throttle valve disposed in an intake line connecting the compressor with the combustion chamber of the engine; a branch line connecting an intake line between the compressor and the intercooler with an intake line between the intercooler and the throttle valve; a shutoff valve disposed in the branch line to selectively open/close the branch line; and an engine control unit controlling the operation of the shutoff valve.

The shutoff valve may be an electronic solenoid valve that is turned on/off in response to a control signal.

The engine control unit may open the shutoff valve such that compressed air supplied from the compressor is supplied directly to the upstream side further than the throttle valve without passing through the intercooler, in sudden acceleration of a vehicle.

The engine control unit may remove oversupplied pressure due to the compressed air at the upstream side further than the throttle valve to the upstream side further than the intercooler by opening the shutoff valve, when the engine is in stop.

Various aspects of the present invention provide for a turbocharger system with a compressor that is connected with a turbine operated by an exhaust gas by a rotary shaft and compresses and supplies external gas to a combustion chamber of an engine. The turbocharger system may include: an intercooler and a throttle valve disposed in an intake line connecting the compressor with the combustion chamber of the engine; a branch line connecting one side of an intake line between the compressor and the intercooler with the other side of an intake line between the intercooler and the throttle valve; a shutoff valve disposed in the branch line to selectively open/close the branch line; and an engine control unit controlling the operation of the shutoff valve, in which the engine control unit may open the shutoff valve such that compressed air supplied from the compressor is supplied directly to the upstream side further than the throttle valve without passing through the intercooler, in sudden acceleration of a vehicle.

The shutoff valve may be an electronic solenoid valve that is turned on/off in response to a control signal.

The engine control unit may bypass oversupplied pressure due to the compressed air at the upstream side further than the throttle valve to the upstream side further than the intercooler by opening the shutoff valve, when the engine is in stop.

The turbocharger system with a compressor that is connected with a turbine operated by an exhaust gas by a rotary shaft and compresses and supplies external gas to a combustion chamber of an engine.

The turbocharger system may include: an intake pipe connected with the compressor for sucking external air; an intercooler and a throttle valve in an intake line connecting the compressor with the combustion chamber of the engine; a branch line connecting the intake pipe with the intake line between the intercooler and the throttle valve; a shutoff valve in the branch line for selectively opening/closing the branch line; and an engine control unit controlling the operation of the shutoff valve.

The shutoff valve may be an electronic solenoid valve that is turned on/off in response to a control signal.

The engine control unit may open the shutoff valve such that fresh air is supplied directly to the upstream side further than the throttle valve without passing through the intercooler from the intake pipe, in sudden acceleration of a vehicle.

The engine control unit may remove oversupplied pressure due to the compressed air at the upstream side further than the throttle valve to the intake pipe by opening the shutoff valve.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
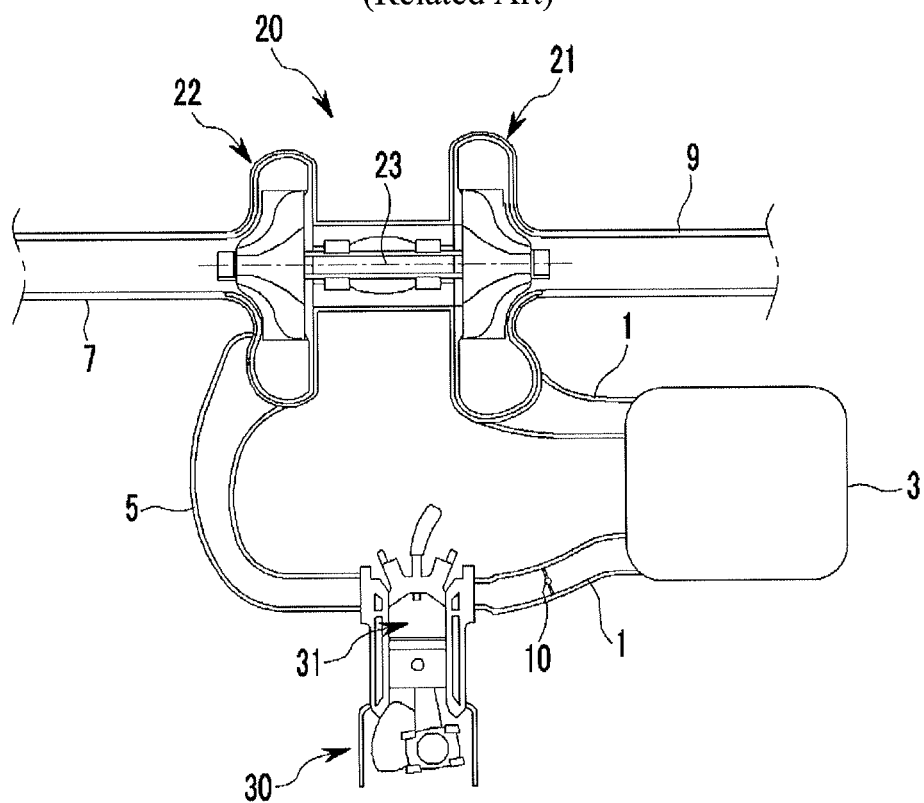
FIG. 1 is a schematic diagram of a turbocharger system according to the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The sizes and thicknesses of the configurations shown in the drawings are provided selectively for the convenience of description, such that the present invention is not limited to those shown in the drawings and the thicknesses are exaggerated to make some parts and regions clear.

In detailed description of the configurations according to various embodiments of the present invention, like reference numerals are given to like components of the related art for better comprehension and ease of description.

Figure 2:
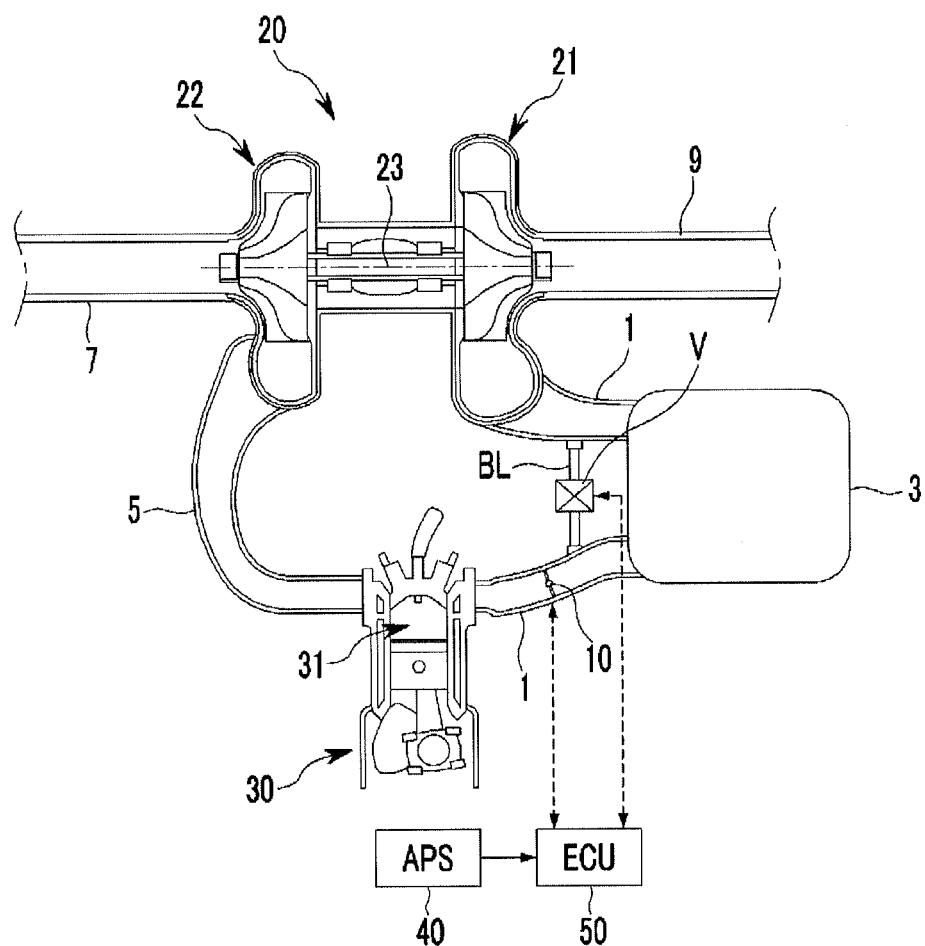
FIG. 2 is a schematic diagram of an exemplary turbocharger system according to the present invention.

FIG. 2 is a schematic diagram of a turbocharger system according to various embodiments of the present invention.

Referring to FIG. 2, a turbocharger system 20 according to various embodiments of the present invention includes a turbine 22 that is turned by an exhaust gas discharged through an exhaust pipe 7 from an exhaust manifold 5 and a compressor 21 that is connected with the turbine 22 by a rotary shaft 23, sucks and compresses external air through an intake pipe 9, and supplies compressed air into a combustion chamber 31 of an engine 30 through an intake line 1.

The supplied air is cooled through an intercooler 3 in the intake line 1 and supplied into the combustion chamber 31 of the engine 30 through a throttle valve 10.

In the turbocharger system 20 according to various embodiments of the present invention, the intake line 1 connecting the compressor 21 with the intercooler 3 and the intake line 1 connecting the intercooler 3 with the throttle valve 10 are connected by a branch line BL.

A shutoff valve V controlling the branch line BL is disposed in the branch line BL.

The shutoff valve V, which may be an electronic solenoid valve that is turned on/off in response to a control signal, controls opening/closing of the branch line.

An Acceleration Pedal Sensor (APS) 40 measures the operation of an accelerator pedal and outputs a corresponding signal and an ECU 50 controls the operation of the throttle valve 10 and the shutoff valve V in response to signals from the APS 40.

In the turbocharger system 20 having the configuration described above, the ECU 50 allows the compressed air supplied from the compressor 21 to be supplied directly to the upstream side further than the throttle valve 10 from the compressor 21 without passing through the intercooler 3 by opening the shutoff valve V in sudden acceleration of a vehicle.

Therefore, even if there is a sudden drop in boost pressure due to sudden opening of the throttle valve 10 at the upstream side further than the throttle valve 10, in sudden acceleration of a vehicle, the drop is compensated.

That is, a reduction in intake pressure at the upstream side further than the throttle valve 10 due to sudden opening of the throttle valve is compensated, such that turbo-lag generated in the related art is prevented.

Further, in the turbocharger system 20 according to various embodiments of the present invention, when the engine is in stop, the ECU 50 opens the shutoff valve V, similar to the existing Recirculation Valves (RCVs), and bypasses oversupplied pressure (over-charged pressure) due to the compressed air at the upstream side further than the throttle valve 10 to the upstream side further than the intercooler 3 such that surging due to remaining oversupplied pressure can be prevented when the engine is restarted.

An Engine Control Unit (ECU) can control the throttle valve 10 in response to a speed signal of a vehicle, using an accelerator pedal position sensor, and the configuration and operation of the ECU are well known to those skilled in the art and the detailed description is not provided.

Figure 3:
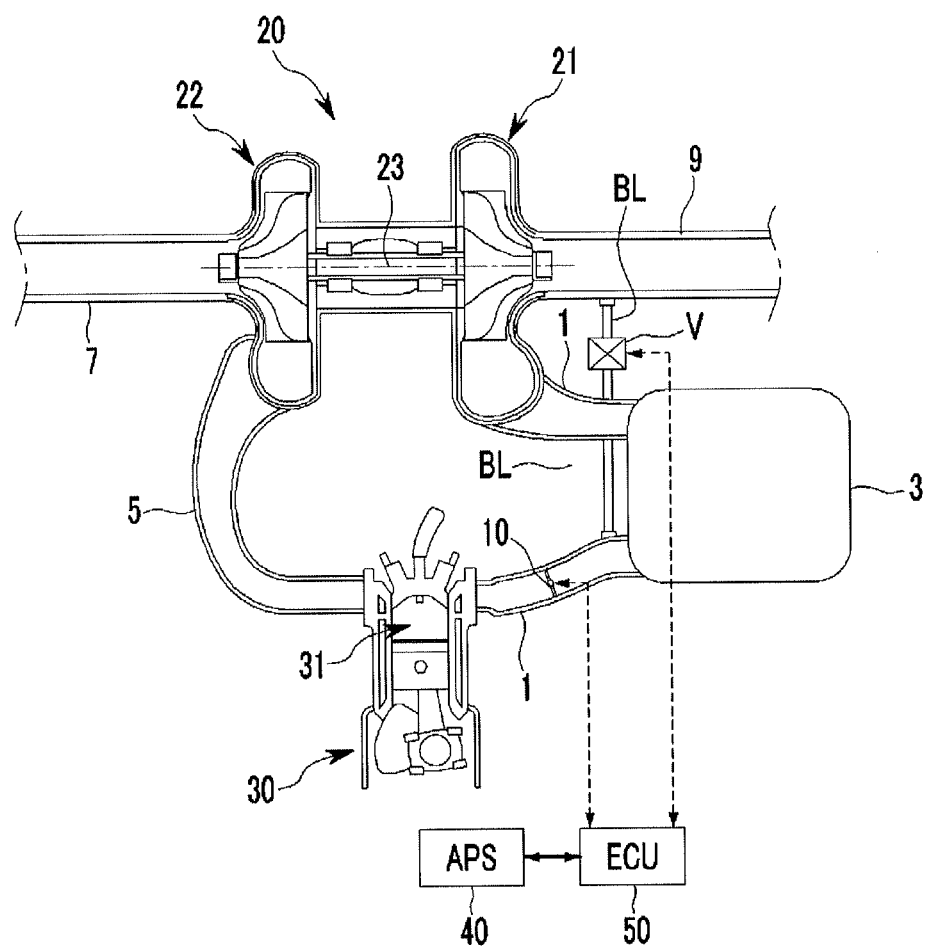
FIG. 3 is a schematic diagram of an exemplary turbocharger system according to the present invention.

FIG. 3 is a schematic diagram of a turbocharger system according to various embodiments of the present invention. In describing the turbocharger system according to various embodiments of the present invention shown in FIG. 3, the same components as those of the turbocharger system according to various embodiments of the present invention shown in FIG. 2 are given the same reference numerals for the convenience of description. Further, in describing the turbocharger system according to various embodiments of the present invention shown in FIG. 3, the same configuration and operation are not described for the convenience of description.

Referring to FIG. 3, a turbocharger system according to various embodiments of the present invention includes an intake pipe 9 connected with the compressor 21 for sucking external air, a branch line BL connecting the intake pipe 9 with the intake line between the intercooler 3 and the throttle valve 10, a shutoff valve V disposed in the branch line BL to selectively open/close the branch line BL, and an ECU 50 controlling the operation of the shutoff valve V.

The ECU 50 opens the shutoff valve V in sudden acceleration of a vehicle so that fresh air is supplied directly to the upstream side further than the throttle valve 10 from the intake pipe 9 without passing through the intercooler 3.

Accordingly, in sudden acceleration of a vehicle, even if boost pressure drops at the upstream side further than the throttle valve 10, the throttle valve 10 compensates for the drop while temporarily opening, such that it prevents turbo-lag.

Further, the ECU 50 removes the oversupplied pressure due to the compressed air at the upstream side further than the throttle valve 10 to the intake pipe 9 by opening the shutoff valve V, when the engine is in stop. Therefore, it is possible to prevent surging shock due to the remaining oversupplied pressure in restarting the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A turbocharger system comprising:
a compressor connected with a turbine operated by an exhaust gas by a rotary shaft and compressing and supplying external gas to a combustion chamber of an engine;
an intercooler and a throttle valve disposed in an intake line connecting the compressor with the combustion chamber of the engine;
a branch line connecting a first intake line of the intake line between the compressor and the intercooler with a second intake line of the intake line between the intercooler and the throttle valve;
a shutoff valve disposed in the branch line to selectively open/close the branch line; and
an engine control unit controlling the operation of the shutoff valve,
wherein, during acceleration of a vehicle, the engine control unit opens the shutoff valve such that compressed air supplied from the compressor is supplied directly to a portion of the second intake line without passing through the intercooler, said portion of the second intake line positioned between the throttle valve and the intercooler.

2. The turbocharger system of claim 1, wherein the shutoff valve is an electronic solenoid valve turned ON and OFF in response to a control signal.

3. The turbocharger system of claim 1, wherein the engine control unit removes oversupplied pressure due to the compressed air at the upstream side further than the throttle valve to the upstream side further than the intercooler by opening the shutoff valve, when the engine is in stop.

4. A turbocharger system comprising:
a compressor connected with a turbine operated by an exhaust gas by a rotary shaft and compressing and supplying external gas to a combustion chamber of an engine;
an intake pipe connected with the compressor for receiving external air;
an intercooler and a throttle valve in an intake line connecting the compressor with the combustion chamber of the engine;
a branch line directly connecting the intake pipe with the intake line between the intercooler and the throttle valve;
a shutoff valve in the branch line for selectively opening/closing the branch line; and
an engine control unit controlling the operation of the shutoff valve.

5. The turbocharger system of claim 4, wherein the shutoff valve is an electronic solenoid valve turned ON and OFF in response to a control signal.

6. The turbocharger system of claim 4, wherein the engine control unit opens the shutoff valve such that fresh air is supplied directly to the upstream side further than the throttle valve without passing through the intercooler from the intake pipe, in an acceleration of a vehicle.

7. The turbocharger system of claim 4, wherein the engine control unit removes oversupplied pressure due to the compressed air at the upstream side further than the throttle valve to the intake pipe by opening the shutoff valve.

* * * * *